Jan. 30, 1934.  W. SHURTLEFF  1,944,908
THERMAL AIR CONDITIONING UNIT
Filed Nov. 25, 1930   3 Sheets-Sheet 1
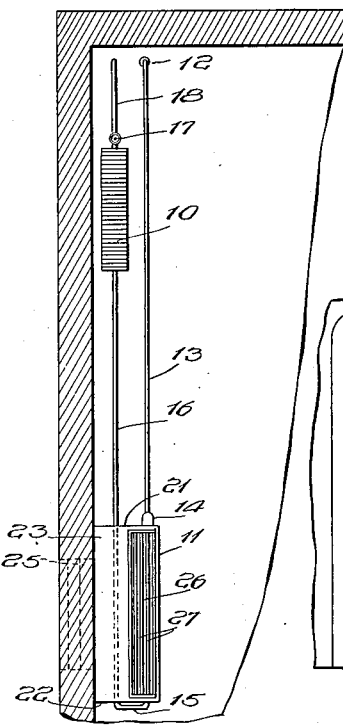
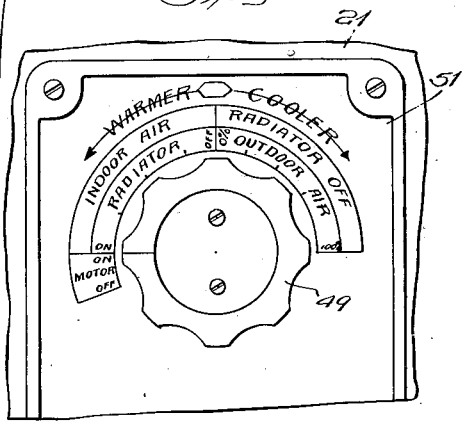
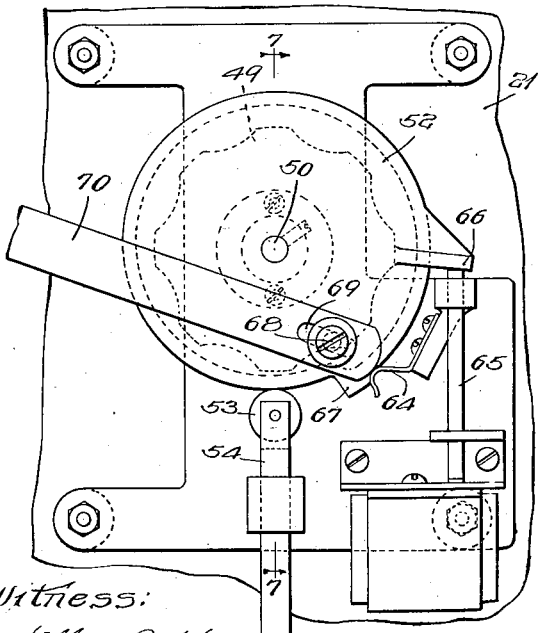
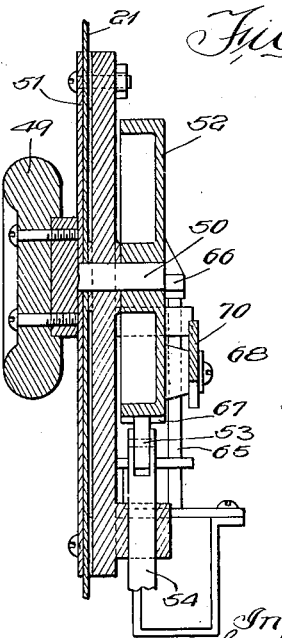
Witness:
William P. Kilroy
Inventor:
Wilfred Shurtleff
By George I. Haight. Atty.

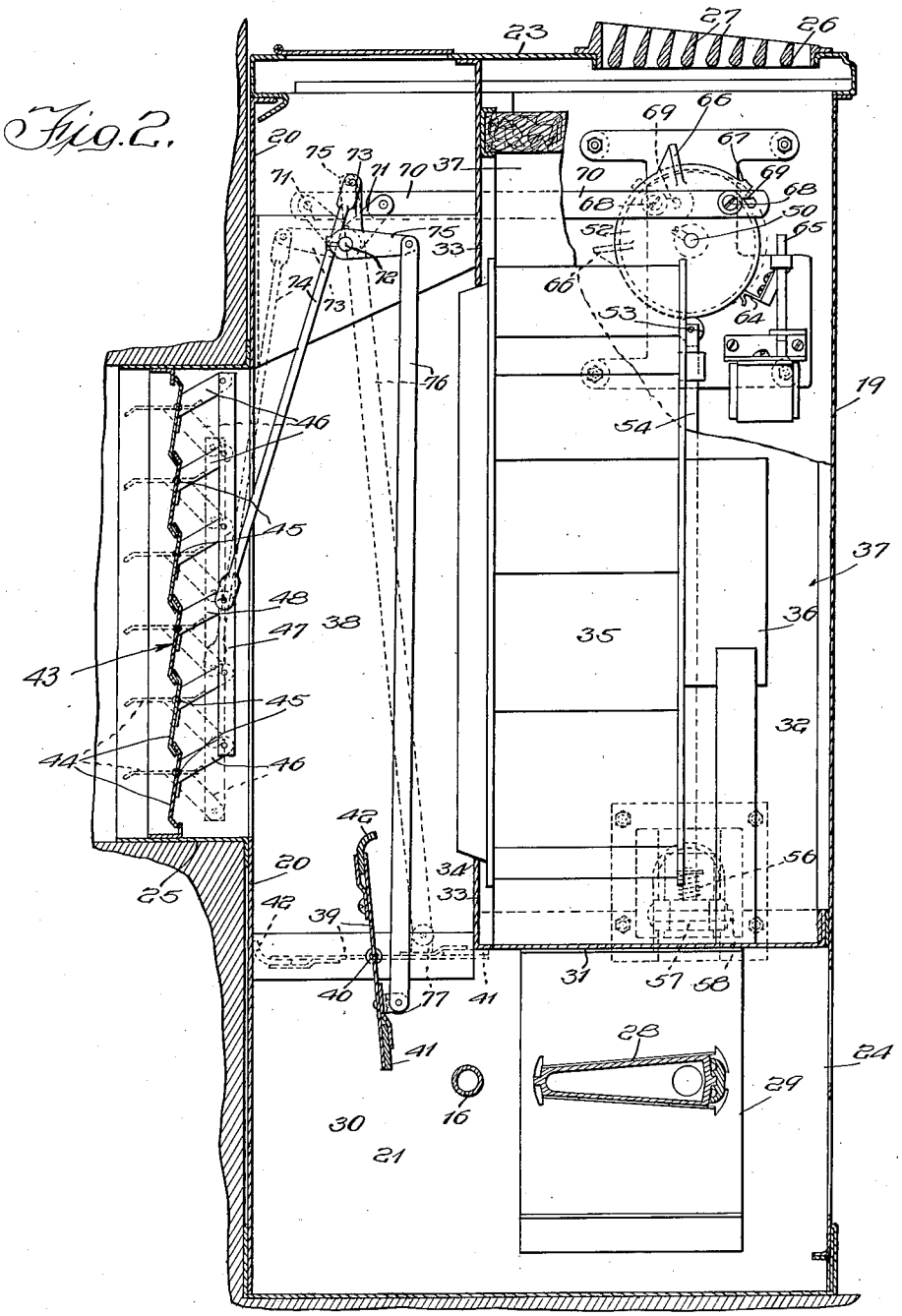

Jan. 30, 1934.     W. SHURTLEFF     1,944,908
THERMAL AIR CONDITIONING UNIT
Filed Nov. 25, 1930    3 Sheets-Sheet 3

Witness:
William P. Kilroy

Inventor:
Wilfred Shurtleff
By George I. Haight
Atty.

Patented Jan. 30, 1934

1,944,908

UNITED STATES PATENT OFFICE 1,944,908

THERMAL AIR CONDITIONING UNIT

Wilfred Shurtleff, Moline, Ill., assignor to The Herman Nelson Corporation, Moline, Ill., a corporation of Illinois Application November 25, 1930
Serial No. 498,096

14 Claims. (Cl. 237—1)

This invention relates to a heating and air conditioning apparatus which is designed primarily to economize on fuel consumption and at the same time to provide means for the successive operation of valves and dampers in such a way as to prevent disagreeable air conditions such as drafts, over-heating or stratification of different temperature layers of stagnant air, and at the same time maintain the atmosphere within the room at a comfortable temperature at all times.

The apparatus in its entirety employs a direct radiator operating in conjunction with a heating and ventilating unit so arranged that the two mechanisms may be operated in co-ordination with one another.

Experience has shown that it is difficult or impossible to economically secure adequate heating by the use solely of heating and ventilating units when the outside temperature falls below freezing, and in these circumstances recourse is had to direct radiation in order to secure rapid heating and until the temperature within the room has risen to a point where the heating and ventilating unit alone is capable of maintaining a desirable room temperature. With rise in room temperature, the direct radiation will first be shut off and after that the valves and dampers of the heating and ventilating unit will be operated in succession to maintain a proper temperature and to admit external air when necessary to prevent over-heating.

The fan in the heating and ventilating unit is utilized to secure proper distribution of the air and prevent stratfication and also to afford invigorating air motion without drafts, which is desirable in order to maintain comfortable room conditions.

Further objects and details of the invention will appear from the description thereof in conjunction with the accompanying drawings, wherein,—

Figure 1 is a diagrammatic plan view of a schoolroom showing a suitable arrangement of the heating and ventilating devices of the present invention;

Fig. 2 is a cross sectional elevation of the heating and ventilating unit adjusted to re-circulate indoor air and exclude outdoor air;

Fig. 5 is a detail of the cam and connections for the valve and dampers;

Fig. 6 is a face view of the dial and hand adjusting knob; and

Fig. 7 is a sectional detail of the knob and cam.

Figure 3:
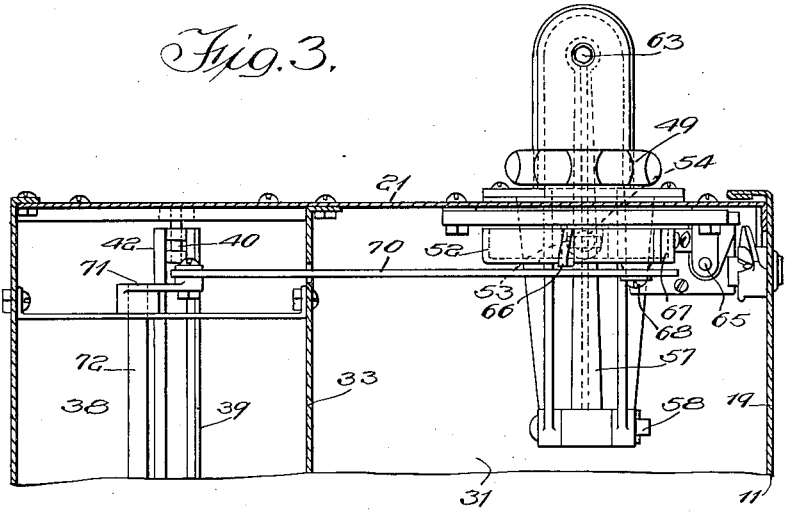
Fig. 3 is a fragmental sectional plan view showing the controls for regulating the valves and dampers.
Figure 4:
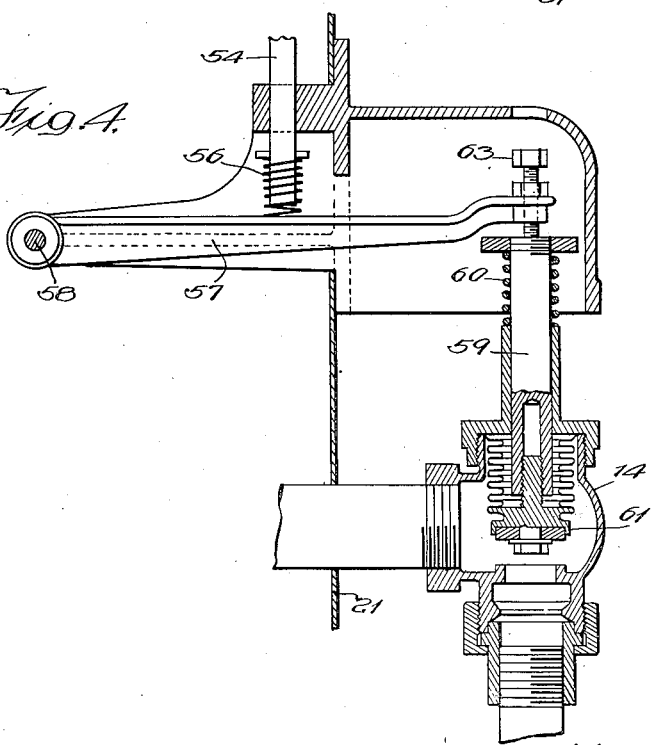
Fig. 4 is a sectional elevation of the valve and control mechanism for regulating the admission of steam.

The apparatus as shown in Fig. 1 includes a direct cast iron radiator 10 and a heating and ventilating unit 11, having in it a light weight radiator of high conductive capacity which is connected in series with the cast iron radiator 65 by the provision of steam piping which includes a supply riser pipe 12 and a supply pipe 13 leading to a steam valve 14 located adjacent to the heating and ventilating unit 11. The steam admitted at this point passes through the radiator of the heating and ventilating unit, presently to be described, and thereafter, by a series connection 15, is directed through the pipe 16 to the cast iron radiator 10 which in turn is connected with a steam trap 17 discharging through a return drop pipe 18. When the room temperature is low, as in the morning of a cold day, the steam will be admitted at sufficient pressure to complete its circuit first through the radiator of the heating and ventilating unit and thereafter through the direct radiator so that the latter will contribute very materially to the rapid heating of the room, but as the room temperature rises, due to the body heat of the occupants and to rise in external temperature, as the day progresses, the steam supply will be reduced by adjustment of the valve 14 so as to cut off the operation of the direct radiator and limit the heating effect of the steam of the unit radiator, after which the heating and ventilating unit alone will operate in a manner presently to be described to maintain a desirable room temperature. Under low pressure steam heating it is possible to partially close the valve 14 and thus restrict the inflow of steam sufficiently to exhaust its heating effect within the unit radiator, so that the direct radiator in connection with the return side of the unit radiator will be in effect completely cut off so that it will cease to function as a heating element in the system, and this circumstance permits the use of a single valve for controlling both radiators rather than separate valves for a like purpose.

The heating and ventilating unit comprises a cabinet of box-like configuration, having a front wall 19, a rear wall 20, end walls 21 and 22, and a flat top or roof 23. The front wall near the base is provided with an elongated inlet 24 for the admission of air from the room for purposes of re-circulation. The rear wall is provided with a duct 25 rearwardly extending from the rear wall and adapted to fit into an opening in a wall of the building for the admission of outdoor air. The heated air is discharged from the top of the unit through an elongated discharge outlet 26 which is provided with a grill affording a plurality of stream-line fins 27 which are set at a slight inward inclination and serve to direct the discharge of air upwardly and slightly inwardly toward the interior of the room. The air is discharged at relatively high velocity and in the form of a long, narrow sheet or current extending from end to end of the unit, and rushing upwardly impinges against the ceiling of the room, and is thence diverted and dissipated in all directions, but with the result that the entire volume of air in the room is subjected to the effects of this discharge which aspirates the room air into motion and dissipates the energy in giving a positive and diffusing movement to all of the air in the room. This has the effect of maintaining an equable temperature and an invigorating air motion to carry away any excess of body heat or feeling of discomfort.

The air admitted to the cabinet is heated by a light-weight radiator of relatively small dimensions but high conductive efficiency which, in the form shown, comprises a core 28 of wedge-shaped formation lying horizontally and provided throughout its length with a multiplicity of closely spaced fins 29 which are threaded or forced on to the core in such way as to maintain a close and intimate metal contact between the core and fins, with a resulting increase in conductivity and the transference of thermal units. The radiator extends from end to end of the cabinet near the base thereof and in close proximity to the indoor inlet duct 24, so that heat admitted through the duct will immediately come into direct contact with the radiator and thence pass through into a rear chamber 30, which also is located at the base of the cabinet and directly behind the radiator.

Immediately above the radiator is located a horizontal partition wall 31 which separates the lower portion of the cabinet from a fan chamber 32, the rear of which is defined by a vertical wall 33 having in its center a large circular aperture 34 which furnishes the inlet to the fan 35 which is driven by a motor 36 directly connected to the fan shaft. The air admitted to the fan is discharged peripherally through an arch-shaped filter 37 which is supported at its base upon the partition wall 31 and arches over the fan.

The rear chamber 30 merges into a fresh air inlet chamber 38 located at the rear of the cabinet and immediately above the rear chamber 30, a damper 39 being interposed between the two chambers to control the upward flow of heated air from the radiator and prevent the back-flow of cold outdoor air into the room when the outdoor inlet is open. The damper 39 is mounted upon a rock shaft 40 and the edges of the damper are provided with facing strips 41 and 42 of felt or the like, which serve, respectively, to contact the under surface of the partition wall 31 and the inner surface of the rear wall 20 when the damper is adjusted into closed position, as indicated in dotted lines in Fig. 2.

The outdoor inlet duct 25 is controlled by means of a multiple damper 43 comprising a plurality of overlapping plates 44 each mounted upon a rock shaft 45. The upper and lower edges of each of the plates are reversely bent or inclined so that when the damper is closed the upper and lower edges of the respective plates will stand in over-lapping relation, as shown. The shafts 45 are respectively provided with crank arms 46 which are connected by a universal link 47, and one of the rock shafts 45 is provided with an arm 48 which is so disposed that a movement imparted to the last mentioned rock shaft will be transmitted to the entire group of rock shafts, with the result that the dampers will be moved from the closed position shown in Fig. 2 to the open position indicated in dotted lines.

Air admitted through the outdoor inlet will be sucked directly into the fan, either solely or in conjunction with heated air admitted from below, depending upon the adjustments of the respective dampers, it being provided, however, that at no time will air in equal volumes be admitted through the respective dampers.

It is desirable in order to secure the most efficient operation, to so coordinate the connections for controlling the operation of the dampers that the operation of the hot air damper will measurably precede that of the cold air damper, so that the hot air damper will be completely closed before the cold air damper is completely opened, thereby insuring against the admission of back drafts of cold air through the indoor intake which might occur in windy weather in case the dampers were not properly regulated in such a manner as to guard against this occurrence.

A description of the valve and damper operating mechanisms will now be given.

Where it is intended to manually operate the controls, the operation is effected by the turning of a knob 49 located on the righthand end wall of the cabinet near the top thereof and in convenient reach of the attendant. The turning of the knob, which is serrated around its periphery, serves to rotate a shaft 50 which is journaled through a dial plate 51 inscribed as in Fig. 6, with suitable instructions to indicate the position of the knob at any instant of adjustment.

As shown in Fig. 6, a turning of the knob in a clockwise direction results in the successive adjustment of the various valves and dampers to reduce the heating effect, while a turning in the opposite direction serves by successive adjustments to increase the heating effect. With the knob adjusted to its extreme left hand position, both of the radiators will be turned on and the outdoor inlet will be closed so that indoor air will be heated by both of the radiators and re-circulated without any added mixture of outdoor air. The first adjustment to the right has the effect of so restricting the supply of steam as to confine the heating effect to the cabinet radiator, thus in effect shutting off the direct radiator so that in this position of adjustment the heating and re-circulation of indoor air will be effected solely by the heating and ventilating unit. As the unit is turned farther to the right, the radiator in the cabinet will next be shut off and after that further turning will begin to close the indoor damper and shortly thereafter begin to open the outdoor damper, so that through progressive stages of adjustment the cooling effect of outdoor air will be secured.

The adjusting shaft 50 extends through an end wall of the cabinet and carries a cam disc 52, which is concentric throughout 240 degrees of its circumference, but is of progressively decreasing radius throughout the remainder.

The cam bears upon a roller 53 carried by a vertical rod 54 which bears upon a spring 56, which in turn bears against a lever arm 57, the inner end of which is pivoted on a pin 58 located on the interior of the cabinet, and the outer end of which lever arm extends through the cabinet wall and is adjustably secured to a valve 59, which extends upwardly from the steam valve 14 and is encircled by a coil spring 60. The lower end of the valve stem carries a valve member 61 adapted to seat upon a valve seat 62 for the purpose of closing or partially closing the steam supplied first to the heating and ventilating unit and thereafter to the direct radiator. Adjustment of the valve stem unit is effected by a screw 63 carried at the end of the lever arm.

In order to provide for shutting off of the motor, when the adjusting knob is turned to the extreme left hand position, a pair of members 64 and 65 are provided, the former of which is in the form of a spring stop bearing against the periphery of the cam disc, and the latter of which is in the form of a stud 65 adapted to be contacted by an outstanding finger 66 at the instant the stop 64 is engaged by a shoulder 67 which results in a depression of the stud 65 which serves to open the switch supplying a current to the motor.

The cam disc also carries a pin 68 operating within a slot 69 in the end of a link 70, the opposite end of which is pivoted to an arm 71 carried by a rock shaft 72 which rock shaft is provided with a crank 73 to which is pivoted the upper end of a draw rod 74 which is pivoted to the arm 48 so that operating movements may be imparted to the outdoor inlet damper.

The rock shaft 72 also carries crank 75 which pivots a vertical rod 76 connected at its lower end to a bracket 77 on the hot air damper 39 so that a lifting movement of the vertical rod 76 will serve to close the hot air damper.

Fig. 2 shows the parts in such position that a continued movement of the operating knob in a clockwise direction will begin to impart a movement to the link 70. Since in this adjustment the crank 75 stands in right angled relation to the rod 76, while the crank 73 stands in substantial parallelism to the rod 74, it is evident that at the beginning of the adjustment the hot air damper 39 will begin to close much more rapidly than the fresh air dampers will begin to open, which is desirable in order to prevent the admission of cold air under outside wind pressure to the base of the cabinet. The linkage shown has a ratio of movement such as to reduce by considerably more than 20% the total inlet area open to admit air to the fan while the damper connections occupy intermediate positions of adjustment, which materially increases the suction of the fan and prevents back circulation and the discharge of exterior air through the indoor air inlet while both dampers are partially open, and it is necessary to provide for this restriction in substantial degree in order to secure the beneficial results above indicated. On the return movement, it is also evident that the cold air dampers will begin to close more rapidly than the hot air damper begins to open so that the supply of cold air will be restricted, and the vacuum occasioned by the suction of the fan increased, with the result that the outdoor air, despite wind pressure, will continue to be drawn inwardly through the fan and discharged upwardly toward the ceiling, so that at no position of adjustment will there be any danger of back drafts through the re-circulation duct despite heavy wind pressures which would tend to occasion such back draft if adequate provision were not made to prevent them.

Operation

The operation of the device may be briefly described as follows:

The initial turning of the knob away from the extreme lefthand position of adjustment will cause a turning of the cam disc which starts the motor. In this position of adjustment the reduced portion of the cam disc will bear upon the roller at the upper end of the rod 54, allowing the rod to be lifted by the action of the steam valve spring 60 which opens the valve to the fullest extent, permitting sufficient steam pressure to enter the steam supply pipe to operate the direct radiator as well as the radiator in the heating and ventilating unit. In this position of adjustment, also, the pin 68 on the cam disc will occupy a position at the extreme outer end of the slot 69 in the link 70, so that a considerable range of movement of the cam disc will be permitted before the lost motion is taken up and the pin advances to the inner end of the slot.

During this entire range of movement of approximately 120° and while the steam pressure is being gradually reduced and finally cut off by the forcing down of the steam supply valve, the dampers will remain in the positions of adjustment indicated in Fig. 2, that is to say, the hot air damper will be fully opened and the cold air damper will be fully closed.

After this valve closing movement has progressed to an intermediate degree, the steam supply will be restricted to an extent which cuts off the supply of steam to the direct radiator while still permitting the steam to circulate within the radiator in the heating and ventilating unit, so that for a time the indoor air will continue to circulate through the unit and be heated by contact with the radiator in the unit, and not until the steam has been completely shut off from the last mentioned radiator will the outdoor damper begin to open to admit air to the unit. When it is desired to again increase the temperature of the room, the same operations are performed in the reverse sequence.

The method of heating and ventilating above described is extremely economical in that no heat is expended in the radiators in the effort to heat up outdoor air, since both radiators will be shut off before any outside air is admitted. At the same time, during extremely cold weather, there will be a considerable infiltration of external air which would normally tend to stratify in cold layers near the floor of the room, but the maintenance of air currents due to the high velocity discharge of heated air from the heating and ventilating unit, will not only tend to prevent stratification, but will also circulate the heated air to all portions of the room and commingle it with the colder air admitted by infiltration, so that a constant current of air will be maintained throughout all portions of the room, which is conducive to bodily comfort and prevents overheating at the ceiling and chilling at the floor level.

By inter-connecting the controls for the valves and dampers, and by operating them from a common point, maladjustment of the apparatus will be prevented.

In order to get the best diffusion of room air, it is quite essential to keep the temperature of the heated air discharged from the unit below 110° F. at the outlet, since otherwise the discharge of heated air has a tendency to stratify near the ceiling of the room and defeat the object of the present invention. The use of a direct radiator permits the heating and ventilating unit to be operated efficiently and economically and at a discharging temperature sufficiently low to prevent stratification and at the same time the air currents engendered by the vertical discharge from the unit, tend to maintain a circulation of air in the neighborhood of the direct radiator so that air heated from that source will be commingled with the air from the unit and carried to all portions of the room.

Experience has shown that it is not practicable to heat the usual schoolroom entirely by the air discharged from the heating and ventilating unit when the weather is below freezing, owing to the tendency of air to stratify when temperature differences are extreme, but that with the combination of direct and indirect radiation provided for in the present invention, a schoolroom or like place of assembly can be maintained in a comfortable state regardless of variations in the outdoor temperature.

The operation of the present invention is based upon the recently accepted theory that no extra outside air is required in a crowded schoolroom in the morning in cold weather, because the night period has restored invigorating purity which the air motion prolongs, and that the heat of the bodies of the occupants, and rise in outdoor temperature as the day progresses, may usually heat the room later to a degree which requires the admission of outside air for cooling purposes and to freshen the room air without waste of artificial heat from the radiators. This method of operation results in great saving in fuel cost and at the same time tends to maintain comfortable conditions in the room at all times.

Although the invention, in its present embodiment, has been illustrated and described as being equipped with means for maintaining manual control of the apparatus, nevertheless it is not the intention to confine the claims to such method of control, since recourse may be had to automatic thermostatic control where a control where a control of that character is desired.

I claim:

1. In apparatus of the character described, the combination of a direct radiator, a heating and ventilating unit having a heating appliance fitted thereinto and being provided with damper controlled inlets for the admission of indoor air from the room and external air, respectively, the heating and ventilating unit being provided with means for inducing suction of air from either of the inlets and causing a discharge of air from the unit, means for supplying a heating medium to the direct radiator and the unit heating appliance, and interconnected means for controlling the supply of heating medium to the radiator and heating appliance and for controlling the respective dampers in predetermined sequence.

2. In apparatus of the character described, the combination of a direct radiator, a heating and ventilating unit having a heating appliance fitted thereinto and being provided with damper controlled inlets for the admission of indoor air from the room and external air, respectively, the heating and ventilating unit being provided with means for inducing suction of air from either of the inlets and causing a discharge of air from the unit, means for supplying a heating medium to the direct radiator and the unit heating appliance, and means for controlling the supply of heating medium to the radiator and heating appliance and for controlling the respective dampers, said controlling means being interconnected to operate in sequence to first shut off supply of the heating medium to the direct radiator, then to shut off supply of the heating medium to the unit heating appliance, and thereafter to close the room inlet and open the external inlet.

3. In apparatus of the character described, the combination of a direct radiator, a heating and ventilating unit having a heating appliance fitted thereinto and being provided with damper controlled inlets for the admission of indoor air from the room and external air, respectively, the heating and ventilating unit being provided with means for inducing suction of air from either of the inlets and causing a discharge of air from the unit, means for supplying a heating medium to the direct radiator and the unit heating appliance, and means for controlling the supply of heating medium to the radiator and heating appliance and for controlling the respective dampers, said controlling means being inter-connected to operate in sequence to first shut off supply of the heating medium to the direct radiator, then to shut off supply of the heating medium to the unit heating appliance, and thereafter to close the room inlet and open the external inlet, the full closing of the room inlet preceding the full opening of the external inlet, and the several operations being reversible in inverse series.

4. In apparatus of the class described, the combination of a direct radiator, a heating and ventilating unit provided with a heating appliance located near its base, a fan located above the heating appliance, and an upwardly directed discharge outlet, and being further provided with a re-circulation air inlet near the base of the unit for admitting internal air directly to the radiator, and an external air inlet in the back of the unit for admitting air directly to the fan, a damper for controlling the flow of air from the indoor air inlet to the fan, a damper for controlling the flow of external air to the fan, and inter-connected controlling means for respectively controlling the admission of heating medium to the direct radiator and to the unit heating appliance and for regulating the dampers in pre-determined series.

5. In apparatus of the class described, the combination of a direct radiator, a heating and ventilating unit provided with a heating appliance located near its base, a fan located above the heating appliance, and an upwardly directed discharge outlet, and being further provided with a re-circulation air inlet near the base of the unit for admitting internal air directly to the radiator, and an external air inlet in the back of the unit for admitting air directly to the fan, a damper for controlling the flow of air from the indoor air inlet to the fan, a damper for controlling the flow of external air to the fan, and inter-connected controlling means for respectively controlling the admission of heating medium to the direct radiator and to the unit heating appliance and for regulating the dampers in pre-determined series, the controls being so inter-connected as to first shut off heating medium from the direct radiator, then from the unit heating appliance while the indoor air damper is open and the external air damper is closed, and thereafter operating to close the indoor air damper and open the external air damper.

6. In apparatus of the class described, the combination of a direct radiator, a heating and ventilating unit provided with a heating appliance located near its base, a fan located above the heating appliance, and an upwardly directed discharge outlet, and being further provided with a re-circulation air inlet near the base of the unit for admitting internal air directly to the radiator, and an external air inlet in the back of the unit for admitting air directly to the fan, a damper for controlling the flow of air from the indoor air inlet to the fan, a damper for controlling the flow of external air to the fan, and inter-connected controlling means for respectively controlling the admission of heating medium to the direct radiator and to the unit heating appliance and for regulating the dampers in predetermined series, the controls being so interconnected as to first shut off heating medium from the direct radiator, then from the unit heating appliance while the indoor air damper is open and the external air damper is closed, and thereafter operating to close the indoor air damper and open the external air damper, the complete closing of the indoor air damper preceding the complete closing of the external air damper, and the parts also being operable in inverse series.

7. In apparatus of the character described, the combination of a direct radiator, a heating and ventilating unit provided with a radiator, a fan, an indoor air inlet, an external air inlet, and a discharge opening in the top of the unit, a series connection for first admitting heating medium to the unit radiator and thereafter admitting the same heating medium to the direct radiator, a valve for controlling the admission of said heating medium, a damper for controlling the inflow of indoor air through the indoor air inlet, a damper for controlling the inflow of external air through the external air inlet, and means for successively operating the valve and the two dampers to first shut off the flow of heating medium to the direct radiator and then to the unit radiator while the indoor inlet damper is open and the external air damper is closed, and to thereafter close the indoor air inlet damper and open the external air inlet damper.

8. In apparatus of the character described, the combination of a direct radiator, a heating and ventilating unit provided with a radiator, a fan, an indoor air inlet, an external air inlet, and a discharge opening in the top of the unit, a series connection for first admitting heating medium to the unit radiator and thereafter admitting the same heating medium to the direct radiator, a valve for controlling the admission of said heating medium, a damper for controlling the inflow of indoor air through the indoor air inlet, a damper for controlling the inflow of external air through the external air inlet, and means for successively operating the valve and the two dampers to first shut off the flow of heating medium to the direct radiator and then to the unit radiator while the indoor inlet damper is open and the external air damper is closed, and to thereafter close the indoor air inlet damper and open the external air inlet damper, the full closing of the indoor air inlet damper preceding the full opening of the external air inlet damper, and the controls being also operable in inverse series.

9. In apparatus of the character described, the combination of a direct radiator, a heating and ventilating unit provided with a radiator, a fan, an indoor air inlet, an external air inlet, and a discharge opening in the top of the unit, a series connection for first admitting heating medium to the unit radiator and thereafter admitting the same heating medium to the direct radiator, a valve for controlling the admission of said heating medium, a damper for controlling the inflow of indoor air through the indoor air inlet, a damper for controlling the inflow of external air through the external air inlet, a cam, and means for manually turning the cam to various positions of adjustment, connections operable by said cam for progressively opening and closing the valve, and connections operable by the movement of said cam for closing the indoor air inlet damper and opening the external air inlet damper and for reversing said operations.

10. In apparatus of the character described, the combination of a direct radiator, a heating and ventilating unit in the form of a cabinet provided near its base with an indoor air inlet and provided in its rear wall with an external air inlet and provided in its top with an air discharge outlet, a unit radiator located near the base of the cabinet and in line with the indoor air inlet, a fan above the radiator and having its intake in alignment with the external air inlet, a damper interposed between the unit radiator and the fan for controlling the inflow and heating of indoor air, a damper in the external air inlet for controlling the inflow of external air therethrough, piping for connecting the unit radiator and the direct radiator in series, a valve for controlling the flow of heating medium through said piping and located to permit the heating medium to first enter the unit radiator, a manually operated device for controlling the valve and dampers, and connections leading from said device, respectively, to said valve and each of said dampers and so related as to first restrict the flow of heating medium to the extent required to cut off the supply to the direct radiator and thereafter cut off the supply to the unit radiator while the indoor air inlet damper is open and the external air inlet damper is closed, and to thereafter close the indoor air inlet damper and open the external air inlet damper, and to perform said operations in inverse series.

11. In apparatus of the character described, the combination of a ventilating unit provided with valve-controlled heating means, a motor-operated fan, and an electric switch for controlling the flow of current to said motor, an indoor air inlet, an exterior air inlet, and an upwardly directed discharge outlet, a damper for controlling the flow of air through the indoor air inlet, a damper for controlling the inflow of external air through the exterior air inlet, and controlling means for progressively closing the electric switch and the heating valve and restricting the flow of indoor air while both inlet dampers are partially open, then fully closing the indoor air inlet damper and fully opening the exterior air inlet damper in progressive order and for reversing said operations.

12. In an apparatus of the character described, the combination of a unit ventilator provided with the indoor and exterior air inlets and a discharge outlet to the room to be conditioned, a chamber in communication with both of said inlets and the discharge outlet, a fan adapted to maintain a suction in said chamber, swinging dampers positioned to control the respective inlets, an operating rod for each of the dampers, a rotatable bell crank member provided with outstanding crank arms pivoted to the respective rods, the parts being so related that when the indoor air inlet damper is closed and the outdoor air inlet damper is fully opened, the operating rod of the indoor air inlet damper will stand in substantially parallel relation to the crank arm with which it is connected, and the operating rod for the exterior air inlet damper will stand in substantially right angular relation to the crank arm with which it is connected so that upon rotation of the bell crank member, the exterior air inlet damper will close more rapidly than the indoor air inlet damper opens the parts being so related as to reduce the total inlet area open to admit restricted quantities of air to the fan during the intermediate positions of adjustment of the dampers.

13. In apparatus of the character described, the combination of a unit ventilator provided with indoor and exterior air inlets and a discharge outlet to the room to be conditioned, a chamber in communication with both of said inlets and the discharge outlet, a fan adapted to maintain a suction in said chamber, a damper for the indoor air inlet, a damper for the exterior air inlet and connections for the dampers having a ratio of movement such as to close the indoor air inlet damper with sufficiently greater rapidity than the opening of the exterior air inlet to restrict by not less than twenty percent the volume of air admitted at certain positions within the range of intermediate adjustments of both dampers to materially increase the suction of the fan and prevent back circulation of exterior air through the indoor air inlet while both dampers are partially open.

14. In apparatus of the character described, the combination of a unit ventilator provided with indoor and exterior air inlets and a discharge outlet to the room to be conditioned, a chamber in communication with both of said inlets and the discharge outlet, a fan adapted to maintain a suction in said chamber, a heating element located in the line of flow of air from the indoor inlet to said chamber, and a damper for the indoor air inlet, a damper for the exterior air inlet, and connections for the dampers, having a ratio of movement such as to close the indoor air inlet damper with sufficiently greater rapidity than the opening of the exterior air inlet to restrict by not less than twenty percent the volume of air admitted at certain positions within the range of intermediate adjustments of both dampers to materially increase the suction of the fan and prevent back circulation of exterior air through the indoor air inlet while both dampers are partially open.

WILFRED SHURTLEFF.